H. N. McCONOUGHEY,

Assignor to J. M. HART, A. H. SMITH & S. J. BOTTS.

Check-Row Corn-Planter.

No. 8,640. Reissued Mar. 25, 1879.

Witnesses
Rud. G. Dieterich
George Binkenburg

Inventor
Hulbert N. McConoughey
by atty DeWitt C. Allen

N. PETERS, PHOTO-LITHOGRAPHER, WASHINGTON, D. C.

UNITED STATES PATENT OFFICE.

HULBERT N. McCONOUGHEY, OF GRANT, IOWA, ASSIGNOR TO JAMES M. HART, AUSTIN H. SMITH, AND SIDNEY J. BOTTS.

IMPROVEMENT IN CHECK-ROW CORN-PLANTERS.

Specification forming part of Letters Patent No. 205,283, dated June 25, 1878; Reissue No. 8,640, dated March 25, 1879; application filed February 26, 1879.

*To all whom it may concern:*

Figure 1:
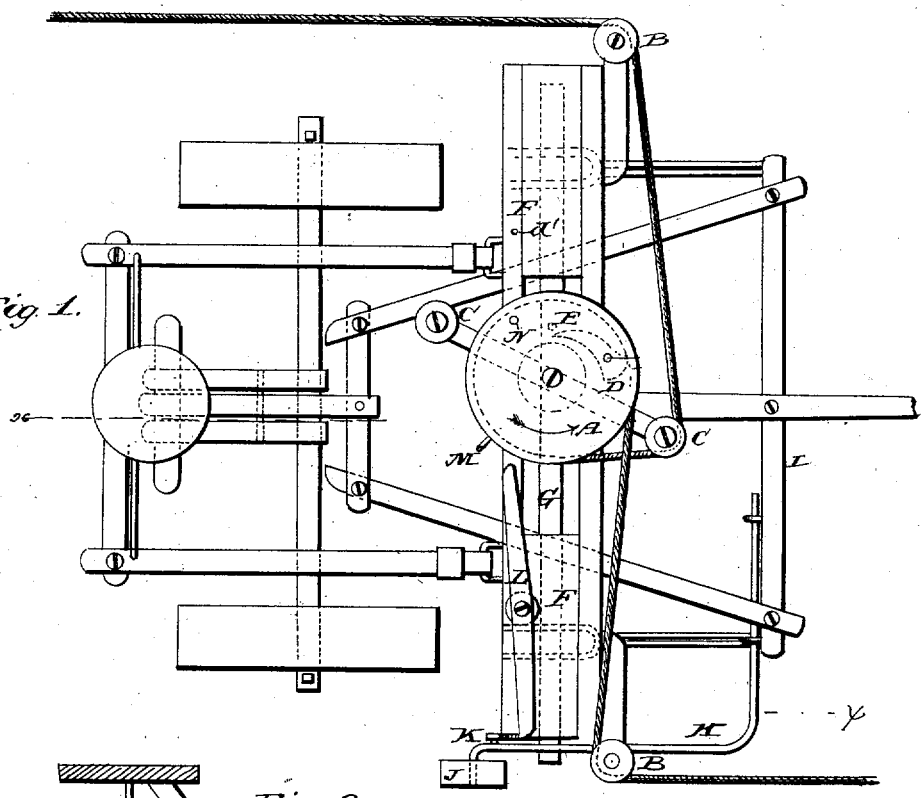
Figure 2:
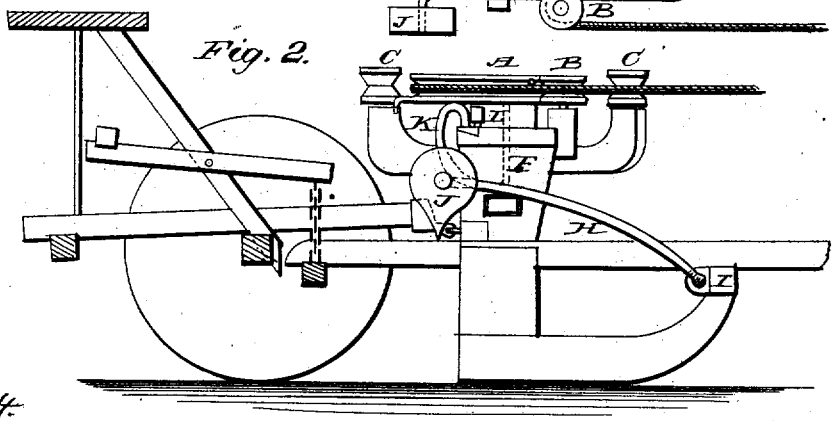
Figure 4:
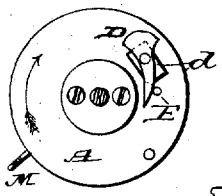
Figure 3:
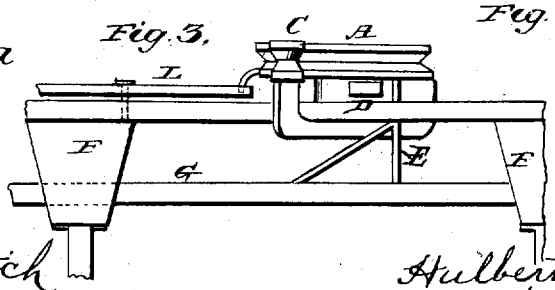
Figure 5:
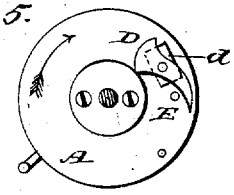

Be it known that I, HULBERT N. McCONOUGHEY, of Grant, in the county of Montgomery and State of Iowa, have invented a new and useful Improvement in Smooth-Rope Check-Row Corn-Planters, of which the following is a specification:

Figure 1 is a top view of my improved machine. Fig. 2 is a vertical section of the same, taken through the broken line *x x*, Fig. 1. Fig. 3 is a detail front view of the drop-wheel and its attachments. Fig. 4 is an under-side view of the drop-wheel, showing the cam in one position. Fig. 5 is the same view as Fig. 4, but showing the cam in the other position.

Similar letters of reference indicate corresponding parts.

The object of this invention is to furnish an improved attachment for any ordinary seed-planter, for planting the seed in accurate check-row by means of a smooth rope, which shall be simple in construction, convenient in use, and reliable in operation.

The invention consists in the combination and arrangement of parts, as will be hereinafter fully described, and pointed out in the claims.

To a frame attached to the hoppers or to some part of the forward frame of a corn-planter is journaled the dropping-wheel A, around which passes the rope, which also passes around the guide-pulley B and one of the sheave-pulleys C, and its ends are attached to stakes upon the opposite sides of the field.

The pulleys B are journaled to supports attached to the hoppers F, or to the forward frame, and the pulleys C are journaled to supports arranged diagonally across the frame and at the opposite sides of the dropping-wheel A. The rope is passed around one or the other of the pulleys C, according as the machine is to cross the field in one or the other direction. The pulleys B are placed a little below, and the pulleys C a little above, the level of the dropping-wheel A, to prevent the parts of the rope that cross each other from rubbing upon and wearing each other.

To the under side of the dropping-wheel A, at a little distance from its hub, is pivoted a cam, D, the forward part of which is tapered to a point, and is slightly curved inward, and the side edges of its rear end are curved outward, as shown in Figs. 4 and 5 and in dotted lines in Fig. 1. The cam D operates upon a stud, E, attached to the dropping-slide G, so as to move the slide and drop the seed.

With this construction, when the cam D is in the position shown in Figs. 1 and 4, its point passes between the stud E and the hub of the dropping-wheel A, and pushes the said stud outward. As the wider rear end of the cam D passes the stud E its forward end is thrown outward, so that at the next revolution of the wheel A it may pass upon the outer side of the stud E, as shown in Fig. 5, and push the said stud inward. As the rear end of the cam D passes the stud E its point is again thrown inward. In this way the dropping-slide G is moved alternately in opposite directions by the continuous revolution of the wheel A in the same direction.

The cam D is held in place in either position until moved by the stud E by a spring, *d*, attached to the wheel A directly above the said cam, as shown in Figs. 4 and 5.

In bearings attached to the cross-bar I works the inner part of a rod, H, the outer part of which is bent to the rearward at right angles, and at the rear side of the hoppers is again bent at right angles, to serve as a journal for the small wheel J. The wheel J is weighted upon one side, and has a wedge-shaped projection formed upon the said weighted side, so as to mark the ground opposite a cross-row when allowed to drop.

To the rod H, at its rear angle, is pivoted a small hook, K, to be hooked in a recess in the upper side of the rear edge of the frame that supports the dropping-wheel A.

To the frame-work of the machine is pivoted the center of a lever, L, which is made of such a length that when turned across the machine its outer end may strike the hook K, and its inner end may be struck by a stop, M, attached to the dropping-wheel A in such a position that it will strike the lever L, and drop the marking-wheel J just as a hill is being dropped, and will thus mark the ground directly opposite the said hill.

With this construction, when the hill next to the last hill of a row has been dropped, the driver moves the lever J so that its inner end will be struck by the stop M, and the last cross-row marked to serve as a guide for adjusting the machine for the next crossing.

The wheel A is kept from turning while adjusting the rope by a pin, N, passed through a hole formed in it, and into a hole in a frame that supports the said wheel. When not required for use the pin N is carried in a hole, *b*, formed in the said frame.

I am aware that a check-row corn-planter having a sliding seed-bar provided with oscillating shaker-arms and a friction-wheel provided with a pivoted right-angular trip working in a depression in the flange of said wheel, whereby the seed-bar is moved transversely at each semi-revolution of the friction-wheel, is old, and such I distinctly disclaim as my invention; but,

Having thus described my invention, I claim as new and desire to secure by Letters Patent—

1. In a check-row corn-planter, the combination, with a transverse seed-slide provided with a stud, of a horizontal revolving wheel provided with a pivoted cam, adapted to act on opposite sides of said stud at each succeeding revolution of said wheel, substantially as and for the purpose specified.

2. The combination, with seed-slide provided with a stud, of the wheel A, provided with a pivoted spring-cam having its forward part tapered to a point, and slightly curved inwardly, and its rear part with sides curved outwardly, substantially as and for the purpose herein shown and described.

3. The combination, with the rope or cord, wheel A, and pulleys B, of the pulleys C C, journaled to supports arranged diagonally across the frame, and around which the rope or cord is alternately passed at each trip across the field, substantially as and for the purpose specified.

4. The combination of the pivoted bent rod H, the wheel J, weighted upon one side, and provided with a wedge-shaped projection upon the said weighted side, the hook K, the lever L, and the forward frame of a seed-planter, substantially as herein shown and described.

HULBERT N. McCONOUGHEY.

Witnesses:

HENRY HOWARD,
S. M. SMITH.